Oct. 25, 1932.                W. J. MORRILL                1,884,115

SHADED POLE MOTOR

Filed Feb. 25, 1931

Inventor:
Wayne J. Morrill,
by Charles A. Mullen
His Attorney

Patented Oct. 25, 1932

1,884,115

UNITED STATES PATENT OFFICE

WAYNE J. MORRILL, OF FORT WAYNE, INDIANA, ASSIGNOR TO GENERAL ELECTRIC COMPANY, A CORPORATION OF NEW YORK

SHADED POLE MOTOR

Application filed February 25, 1931. Serial No. 518,150.

My invention relates to improvements in shaded pole motors and in particular to schemes for equalizing the fluxes in the shaded and unshaded pole portions of such motors to obtain thereby a more uniform rotating magnetic field.

In an application for patent, Serial No. 518,151, filed concurrently herewith by Clifford A. Nickle and assigned to the same assignee as the present invention the subject matter of the present invention is covered broadly. In said application Mr. Nickle has described the reasons why the shaded pole flux of the conventional motor is less than the unshaded pole flux and why this produces non-uniformity in the character of the rotating magnetic field. He has described and claimed various schemes for equalizing the fluxes in the shaded and unshaded poles and has presented claims to the broad subject matter which is his invention. My invention relates to additional schemes for equalizing such fluxes and more particularly to the use of additional exciting coils on the field element for forcing the same amount of flux through the shading coil as passes through the unshaded pole portion.

Figure 1:
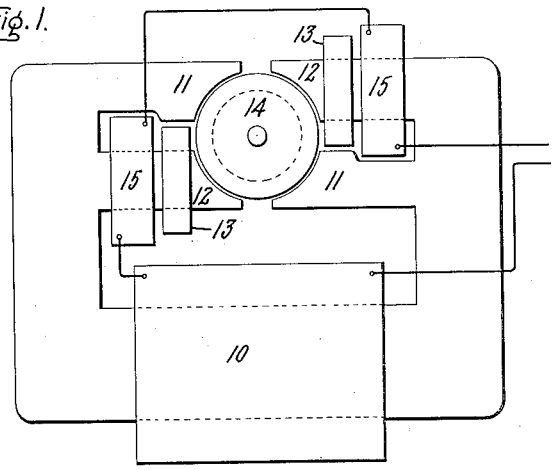
Figure 2:
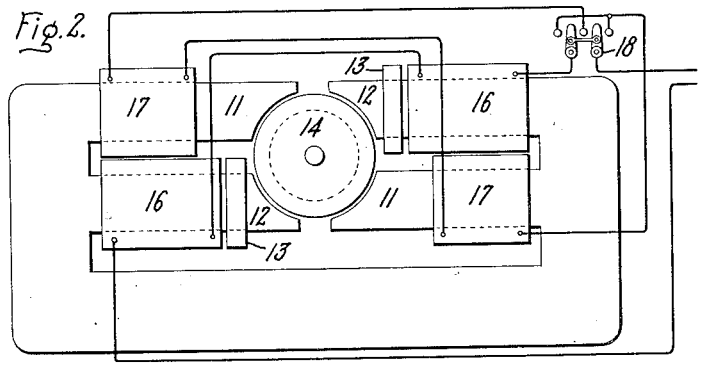
Figure 3:
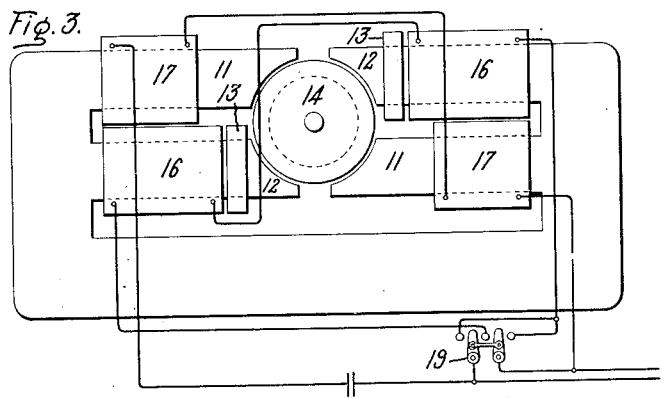
Figure 4:
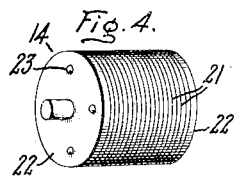

The features of my invention which are believed to be novel and patentable will be pointed out in the claims appended hereto. For a better understanding of my invention reference is made in the following description to the accompanying drawing in which Fig. 1 illustrates a shaded pole motor with an auxiliary exciting coil on the shaded pole for assisting in forcing the desired amount of flux therethrough; Figs. 2 and 3 illustrate shaded pole motors where the entire excitation is provided by exciting coils on the main and unshaded pole portions so proportioned as to produce equal fluxes in such pole portions. By reversing one of these sets of coils the motor may be reversed; and Figs. 4 and 5 relate to the construction of a hysteresis rotor that may be advantageously used in a motor embodying my invention.

In the conventional shaded pole motor the flux of the shaded portions of the poles is less than the flux of the unshaded portions by reason of the increase in effective reluctance of the shaded portions due to the presence of the shading coils. This inequality of the fluxes in the two portions of the poles contributes to the non-uniformity of the rotating magnetic field of the motor. By making the fluxes in the shaded and unshaded pole portions equal in accordance with my invention the field becomes more nearly uniformly rotating in character and the efficiency and the synchronous stability of the motor, if it is of the synchronous type, are materially increased.

In Fig. 1 I have represented a shaded pole motor which, except for auxiliary exciting coils on the shaded poles, has a stator similar to the conventional shaded pole motor. The main exciting coil is represented at 10, the unshaded pole portions at 11, and the shaded pole portions at 12. Shading coils 13 cause the fluxes through 12 to lag behind the fluxes through the unshaded portions 11 to produce rotation of the rotor represented at 14 in a counter-clockwise direction. The shading coils have some resistance, and energy is necessary to induce a current therein. This energy is taken from the flux which threads the shading coils. As a result, the shading coils have the effect of increasing the reluctance of the flux path through the shaded pole portions above that through the unshaded pole portions and, unless this is compensated for, the flux through the shaded portions is less than through the unshaded portions of the poles. It is apparent that if all the flux passed through the unshaded pole portions we would have no effective rotating flux component. Similarly the effective rotating magnetic field component is decreased in proportion to the unequality of the fluxes through the two portions of the poles but becomes a maximum when these fluxes are equal. Therefore I provide the auxiliary exciting coils 15 on the shaded poles for equalizing these fluxes. These auxiliary coils are shown connected in series with the main coil 10. They may be connected in series and then in parallel with coil 10. The connections will be such that all exciting coils tend to produce flux in the same direction through the magnetic circuit of the motor at any instant and the contribution to this flux furnished by coils 15 will be such as to make the flux through pole portions 12 equal to that through pole portions 11 although, due to the shading coils, the flux through portions 12 will lag behind the flux through portions 11.

In addition to equalizing the fluxes an added improvement is obtained because it is now practicable to use a shading coil which gives a somewhat greater lagging effect than heretofore which also improves the character of the rotating magnetic field.

In Fig. 2 the same results are obtained by exciting coils 16 and 17 of different strength on the shaded and unshaded pole portions respectively. These coils supply all the excitation. Coils 16 are made with a sufficiently larger number of turns as compared to coils 15 to make the fluxes in the shaded and unshaded portions equal. The coils are preferably connected in series although they may be connected in parallel. By the arrangement of coils as shown in Fig. 2 it is now possible to reverse the direction of rotation of the rotor by reversing the relative direction of coils 17 with respect to coils 16, and a reversing switch 18 is provided for this purpose. This switch is arranged to connect coils 17 in series with coils 16 to the source of supply and to reverse coils 16 in such connection.

Let us assume the normal arrangement where the left hand pole portions 11 and 12 produce flux in the same direction at a given instant. Coil 13 lags its portion of the flux and we obtain counter-clockwise rotation. If now we reverse coils 17 we may consider the bottom two pole sections 11 and 12 as forming one pole and producing flux in the same direction at any instant. Coil 13 lags its portion of the flux and clockwise rotation results. If the centers of the four pole face sections are 90 degrees apart the motor will have the same torque characteristics in both directions of rotation.

In Fig. 3 I have represented an arrangement somewhat similar to Fig. 2 but the coils 17 are connected in parallel to coils 16 and the latter are arranged to be reversed by the switch 19. I can now employ a condenser 20 in the circuit of the coils 17 on the unshaded pole portions to obtain a greater angle of lag between the shaded and unshaded fluxes. Thus the shading coils lag the flux through 12 behind the normal angular position and the condenser causes the flux through pole portions 11 to lead its normal angular position. A very favorable angle of lag and a better power factor are possible with a relatively small inexpensive condenser. The coils 16 and 17 should have the correct number of ampere turns to make the fluxes therethrough substantially equal.

Figure 5:
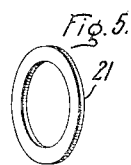

The principles described are applicable to all shaded pole motors including those of the disc type where only one shaded pole is employed. The armature or rotor 14 may be of the induction, of the induction synchronous, or of the synchronous type. The invention is particularly advantageous in small self-starting synchronous motors of the hysteresis type, as pointed out in the aforementioned application of Mr. Nickle, employing a rotor made up of a number of annular-shaped steel laminations suitably supported on the shaft as represented in Fig. 1. The hysteresis element of the rotor preferably comprises a stack of annular steel laminations 21, one of which is represented in Fig. 5. These laminations may be secured to the shaft by end plates 22 of non-magnetic material fastened together by rivets 23. Such a rotor has no salient poles and no locking tendency at standstill. The flux therethrough follows a peripheral path operating at high flux density favorable to a large hysteresis torque. At synchronous speed permanent magnet poles are formed locking the rotor in synchronism with the rotating magnetic field. Owing to the more nearly uniformly rotating character of the field than has heretofore been available in such motors the useful torque at synchronous speed is increased.

I have described several embodiments of my invention. Other arrangements for accomplishing the same purpose will occur to those skilled in the art, and, if within the true spirit and scope of my invention, are intended to be covered by the appended claims.

What I claim as new and desire to secure by Letters Patent of the United States, is:

1. In an alternating current motor, a field element provided with one or more salient poles, such pole or poles being divided into sections with a shading coil on one section and exciting windings for said field element arranged to produce substantially the same amount of flux through the different sections of a pole.

2. An alternating current motor comprising relatively rotatable field and armature members, the field element having a salient pole with shaded and unshaded portions, and field windings for producing substantially equal fluxes through the shaded and unshaded pole portions.

3. An alternating current motor having a field element provided with a salient pole divided into two portions, a shading coil on one portion causing such portion to have a greater effective reluctance than the unshaded portion, and exciting means on said field element arranged to compensate for the greater effective reluctance of the shaded pole portion and force equal fluxes through both portions.

4. An alternating current motor having a salient pole field element, a shading coil surrounding a portion of such pole, exciting means for producing an alternating flux through said pole, and additional exciting means on the shaded pole portion for causing the flux therethrough to be substantially equal to the flux through the unshaded portions of said pole.

5. An alternating current motor having a field element with salient poles, said poles being divided into two portions and shading coils on one portion of each pole, a main exciting winding for said field element producing fluxes in both portions of the poles, auxiliary exciting windings on the shaded pole portions for equalizing the fluxes in the shaded and unshaded pole portions, and a common source of supply for all of said windings.

6. An alternating current motor having a salient pole field element, each pole being divided into two portions with a shading coil on one portion, and exciting windings on both portions proportioned to produce substantially equal fluxes through said portions.

7. An alternating current motor having a salient pole field element and a relatively rotatable armature, the salient poles of the field being divided into two sections, a shading coil on one section, exciting windings on both sections proportioned to produce substantially equal fluxes through both portions, a common source of supply for said exciting windings, and means for reversing the current flow through the windings on the shaded sections with respect to that through the other sections of the poles for reversing the relative direction of rotation of the armature.

8. An alternating current motor having a field element, provided with salient poles divided into two portions, shading coils on one portion of each pole, exciting windings on both portions of each pole, a condenser in series with the windings on the unshaded pole portions, and means for connecting the windings on the shaded and unshaded pole portions in parallel circuits to a common source of supply.

9. An alternating current motor having a field element provided with salient poles divided into two portions, shading coils on one portion of each pole, exciting windings on both portions of each pole proportioned to equalize the fluxes in said portions, a condenser in series with the exciting windings on the unshaded pole portions, and switching means for connecting the shaded and unshaded pole windings in parallel circuits to a common source of supply and for reversing the relative direction of current flow in said parallel connected circuits.

In witness whereof I have hereunto set my hand.

WAYNE J. MORRILL.